United States Patent
Ishida et al.

(10) Patent No.: US 8,903,277 B2
(45) Date of Patent: Dec. 2, 2014

(54) DRIVE TRANSMITTER AND IMAGE FORMING APPARATUS

(75) Inventors: Masahiro Ishida, Kanagawa (JP); Noriaki Funamoto, Tokyo (JP); Yohei Miura, Tokyo (JP); Kimiharu Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 626 days.

(21) Appl. No.: 13/223,816

(22) Filed: Sep. 1, 2011

(65) Prior Publication Data

US 2012/0060633 A1    Mar. 15, 2012

(30) Foreign Application Priority Data

Sep. 15, 2010  (JP) .................. 2010-207090
Mar. 14, 2011  (JP) .................. 2011-055582
Jun. 30, 2011  (JP) .................. 2011-145656

(51) Int. Cl.
| G03G 15/00 | (2006.01) |
| B41J 23/02 | (2006.01) |
| G03G 21/16 | (2006.01) |
| G03G 21/18 | (2006.01) |
| F16H 1/20 | (2006.01) |
| B41J 23/04 | (2006.01) |

(52) U.S. Cl.
CPC .............. *B41J 23/025* (2013.01); *G03G 15/757* (2013.01); *G03G 2221/1657* (2013.01); *G03G 21/1647* (2013.01); *G03G 21/1857* (2013.01); *F16H 1/20* (2013.01); *B41J 23/04* (2013.01)
USPC ...................................... 399/167

(58) Field of Classification Search
CPC ............ G03G 15/757; G03G 21/1857; G03G 21/1647; G03G 2221/1657
USPC .................................. 399/167, 299
See application file for complete search history.

(56) References Cited

U.S. PATENT DOCUMENTS

| 5,160,128 A | 11/1992 | Oishi |
| 5,303,004 A * | 4/1994 | Maruyama et al. |
| 5,832,345 A * | 11/1998 | Damji et al. .................. 399/167 |
| 7,248,819 B2 | 7/2007 | Jeon |
| 2003/0190172 A1 | 10/2003 | Makino |
| 2007/0003321 A1 | 1/2007 | Hara et al. |

(Continued)

FOREIGN PATENT DOCUMENTS

| CN | 1746794 A | 3/2006 |
| JP | 11-109698 | 4/1999 |

(Continued)

OTHER PUBLICATIONS

Chinese Office Action issued Nov. 27, 2013, in China Patent Application No. 201110272504.5.

(Continued)

*Primary Examiner* — Susan Lee
(74) *Attorney, Agent, or Firm* — Oblon, Spivak, McClelland, Maier & Neustadt, L.L.P.

(57) ABSTRACT

A drive transmitter, including a first rotational axis transmitting a drive force of a drive source to a first rotator, a second rotational axis transmitting a drive force of the drive source to a second rotator, and an idler gear configured to transmit a drive force to the second rotational axis; wherein the first rotational axis penetrates the idler gear with a gap therebetween.

9 Claims, 5 Drawing Sheets

(56) References Cited

U.S. PATENT DOCUMENTS

| | | | |
|---|---|---|---|
| 2007/0231007 A1* | 10/2007 | Arakawa | 399/167 |
| 2008/0279581 A1 | 11/2008 | Shimizu | |
| 2010/0028046 A1* | 2/2010 | Abe et al. | 399/167 |
| 2011/0170892 A1* | 7/2011 | Ishida et al. | |

FOREIGN PATENT DOCUMENTS

| | | | |
|---|---|---|---|
| JP | 2000347551 A | * | 12/2000 |
| JP | 2001034022 A | * | 2/2001 |
| JP | 2003-295552 | | 10/2003 |
| JP | 2009-186551 | | 8/2009 |
| JP | 2010-59998 | | 3/2010 |

OTHER PUBLICATIONS

Extended European Search Report issued Dec. 19, 2011, in Patent Application No. 11179083.8.

* cited by examiner

DRIVE TRANSMITTER AND IMAGE FORMING APPARATUS

CROSS-REFERENCE TO RELATED APPLICATIONS

This patent application is based on and claims priority pursuant to 35 U.S.C. §119 to Japanese Patent Application Nos. 2010-207090, 2011-055582, and 2011-145656, filed on Sep. 15, 2010, Mar. 14, 2011, and Jun. 30, 2011, respectively, in the Japanese Patent Office, the entire disclosures of which are hereby incorporated herein by reference.

FIELD OF THE INVENTION

The present invention relates to a drive transmitter and an image forming apparatus.

BACKGROUND OF THE INVENTION

Image forming apparatuses, e.g., printers, facsimiles and copiers include multiple rotators such as photoreceptors and developing rollers that are rotated to form images.

Japanese published unexamined application No. 2003-295552 (JP-2003-295552-A) discloses a drive transmitter including a first drive transmitting part including a dive gear mounted on a motor shaft and a photoreceptor gear engaged with the drive gear to transmit a drive force to the photoreceptor, a second drive transmitting part transmitting a drive force from the same drive motor as that of the photoreceptor to a registration roller and a fixing roller through a drive gear train formed of multiple gears, and a third transmitter transmitting a drive force from the same drive motor as that of the photoreceptor to a developing roller through a drive gear train formed of multiple gears.

In this drive transmitter, a thin-teeth gear, which is part of the drive gear train of the second drive transmitting part, is fixed to the same rotation shaft to which the photoreceptor gear is fixed. Thus, a projected area of the photoreceptor gear in an axial direction (overlapping the photoreceptor gear when axially seen) can effectively be used, and the drive transmitter can be downsized.

However, a rotation load of the fixing roller and the registration roller is also transmitted thereto, resulting in possible speed variation of the photoreceptor.

SUMMARY OF THE INVENTION

Accordingly, an object of the present invention is to provide a downsizable drive transmitter capable of controlling speed variation of a first rotator to which a first rotation shaft transmits a drive force.

Another object of the present invention is to provide an image forming apparatus using the drive transmitter.

These objects and other objects of the present invention, either individually or collectively, have been satisfied by the discovery of a drive transmitter, comprising:

a first rotational axis configured to transmit a drive force of a drive source to a first rotator, a second rotational axis configured to transmit a drive force of the drive source to a second rotator, and an idler gear configured to transmit a drive force to the second rotational axis;

wherein the first rotational axis penetrates the idler gear with a gap therebetween.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention provides a downsizable drive transmitter capable of controlling speed variation of a first rotator to which a first rotation shaft transmits a drive force.

More particularly, the present invention relates to a drive transmitter, comprising:

a first rotational axis configured to transmit a drive force of a drive source to a first rotator, a second rotational axis configured to transmit a drive force of the drive source to a second rotator, and an idler gear configured to transmit a drive force to the second rotational axis;

wherein the first rotational axis penetrates the idler gear with a gap therebetween.

An embodiment of electrophotographic printer (hereinafter referred to as a printer) is explained as the image forming apparatus of the present invention.

Figure 1:
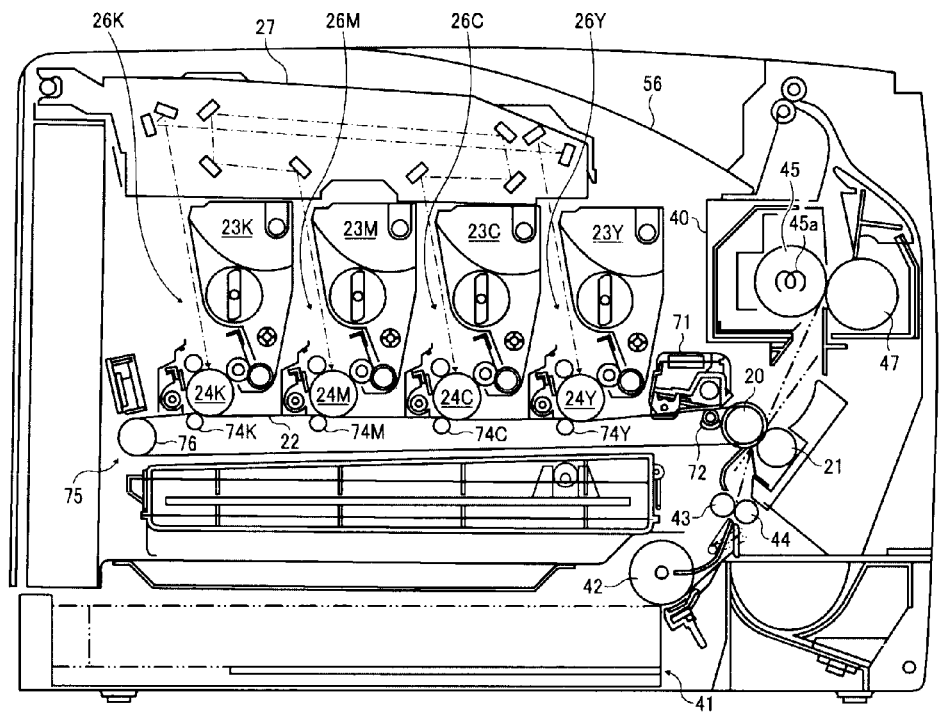
FIG. 1 is a schematic view illustrating an embodiment of the printer of the present invention.
Figure 2:
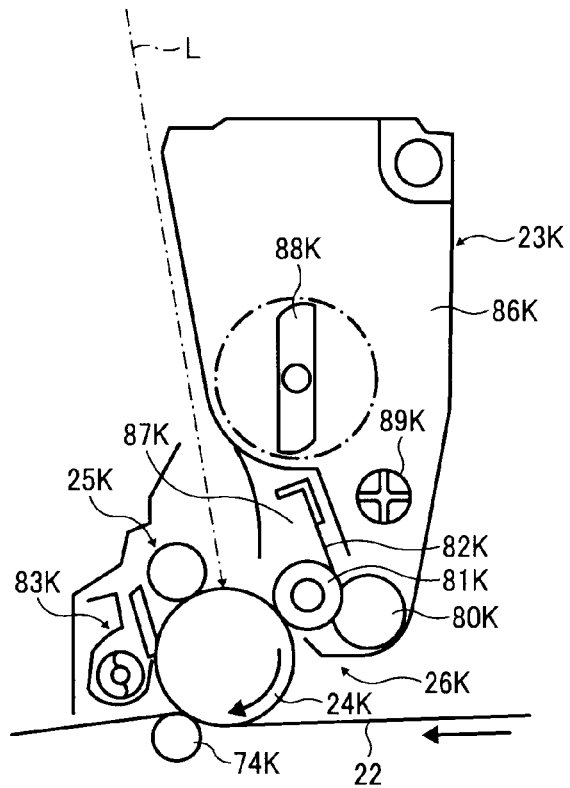
FIG. 2 is a schematic view illustrating a process unit.

First, a basic configuration of the printer is explained. FIG. 1 is a schematic view illustrating an embodiment of the printer of the present invention. In FIG. 1, the printer includes four process units 26Y, 26C, 26M and 26K for forming yellow, magenta, cyan and black (hereinafter referred to as toner images Y, M, C and K) toner images. These use different Y, M, C and K color toners from each other, but have the same configuration and are exchanged at the end of their lives. For example, as FIG. 2 shows, the process unit 26K includes a drum-shaped photoreceptor 24K as a latent image bearer, a drum cleaner 83K, a discharger (not illustrated), a charger 25K, an image developer 23K, etc. The process unit 26K is detachable from the printer and consumable parts are exchangeable at a tome.

The charger 25K uniformly charges the surface of the photoreceptor 24K clockwise rotated by an unillustrated driver. The uniformly-charged surface of the photoreceptor 24K is irradiated and scanned with a laser beam L to bear a K electrostatic latent image. The K electrostatic latent image is developed by the image developer 25K using an unillustrated K toner to form a K toner image. Then, the K toner image is intermediately transferred onto an intermediate transfer belt 22 mentioned later. The drum cleaner 83K removes an untransferred toner adhering to the surface of the photoreceptor 24K after the intermediate transfer process. The discharger discharged a residual charge of the photoreceptor 24K after cleaned. The discharge initializes the surface of the photoreceptor 24K to be ready for a following image formation. In the other process units, i.e., 26Y, 26C and 26M, toner images are formed by the same method on the photoreceptors 24Y, 24C and 24M, and they are intermediately transferred onto the intermediate transfer belt 22 mentioned later. A cylindrical drum of the photoreceptor 24K is a hollow aluminum tube coated with an organic photosensitive layer. Flanges each having a drum axis are mounted on both ends of the drum in an axial direction to form the photoreceptor 24K.

The image developer 23K includes a vertically-long hopper 86K containing an unillustrated K toner and a developing part 87K. The hopper 86K includes an agitator 88K rotationally driven by an unillustrated driver, an agitation paddle 89K rotationally driven by an unillustrated driver vertically below the agitator 89K, a toner feed roller 80K rotationally driven by an unillustrated driver vertically below the agitation paddle 89K, etc. The K toner in the hopper 86K travels to the toner feed roller 80K under its own weight while agitated by rotary drive of the agitator 88K and the agitation paddle 89K. The toner feed roller 80K includes a roller formed of a metallic core and a foamed resin coated on the surface thereof, and rotates while the K toner in the hopper 86K adheres thereto.

The developing part 87K of the image developer 23K includes a developing roller 81K rotating while contacting the photoreceptor 24K and the toner feed roller 80K, a thin layer forming blade 82K contacting the surface thereof, etc. The K toner adhering to the toner feed roller 80K in the hopper 86K is fed to the surface of the developing roller 81K at a contact point between the developing roller 81K and the toner feed roller 80K. A layer thickness of the K toner fed thereto is regulated thereon when passing a contacting point between the roller and the thin layer forming blade 82K. After regulated, the K toner adheres to a K electrostatic latent image on the surface of the photoreceptor 24K in a developing area which is a contact point between the developing roller 81K and the photoreceptor 24K. Thus, the K electrostatic latent image is developed to a K toner image.

The process unit 26K has been explained, using FIG. 2. The process units 26Y, 26C and 26M form Y, C and M toner images on the photoreceptors 24Y, 24C and 24M, respectively by the same process.

In FIG. 1, an optical writing unit 27 is located vertically above the process units 26Y, 26C, 26M and 26K. The optical writing unit 27 which is a latent image writer optically scans the photoreceptors 24Y, 24C, 24M and 24K in the process units 26Y, 26C, 26M and 26K with a laser beam L emitted from a laser diode, based on image information. Thus, Y, C, M and K electrostatic latent images are formed on the photoreceptors 24Y, 24C, 24M and 24K, respectively. The optical writing unit 27 and the process units 26Y, 26C, 26M and 26K form Y, C, M and K toner images on three or more latent image bearers.

The optical writing unit 27 irradiates the laser beam (L) emitted from a light source to the photoreceptor through multiple optical lenses and mirrors while polarizing the laser beam in a main scanning direction with an unillustrated polygon mirror rotationally driven by a polygon motor. An LED beam emitted from multiple LEDs of an LED array may be used.

Vertically below the process units 26Y, 26C, 26M and 26K, a transfer unit 75 endlessly moving the endless intermediate transfer belt 22 anticlockwise while applying a tension thereto. Besides the intermediate transfer belt 22, the transfer unit 75 includes a drive roller 76, a tension roller 20, four first transfer rollers 74Y, 74C, 74M and 74K, a second transfer roller 21, a belt cleaner 71, a cleaning backup roller 72, etc.

The intermediate transfer belt 22 is tensioned by the drive roller 76, the tension roller 20 and the four first transfer rollers 74Y, 74C, 74M and 74K located inside its loop. The intermediate transfer belt 22 is endlessly moved anticlockwise by a rotative force of the drive roller 76 rotationally driven by an unillustrated driver anticlockwise.

The four first transfer rollers 74Y, 74C, 74M and 74K sandwich the endlessly-moved intermediate transfer belt 22 with the photoreceptors 24Y, 24C, 24M and 24K, which forms first transfer nips for Y, C, M and K where the surface of the intermediate transfer belt 22 contacts the photoreceptors 24Y, 24C, 24M and 24K.

Each of the first transfer rollers 74Y, 74C, 74M and 74K is applied with a first transfer bias by an unillustrated transfer bias electric source to form a transfer electric field between each of the electrostatic latent image on the photoreceptors 24Y, 24C, 24M and 24K and the first transfer rollers 74Y, 74C, 74M and 74K. Transfer chargers or brushes can be used instead of the first transfer rollers 74Y, 74C, 74M and 74K.

When a Y toner image formed on the surface of the photoreceptor 24Y in the process unit 26Y enters the first transfer nip Y with the rotation of the photoreceptor 24Y, the Y toner image is first transferred onto the intermediate transfer belt 22 therefrom due to the transfer electric field and a pressure of the nip. When the intermediate transfer belt 22 on which the Y toner image is first transferred passes the first transfer nips for M, C and K with its endless move, M, C and K toner images on the photoreceptors 24M, 24C and 24K are overlappingly first transferred onto the Y toner image in sequence. This overlapped first transfers form a four-color toner image on the intermediate transfer belt 22.

The second transfer roller 21 in the transfer unit 75 is located outside the loop of the intermediate transfer belt 22, and sandwiches the intermediate transfer belt 22 with the tension roller 20 located inside the loop, which forms a second transfer nip where the surface of the intermediate transfer belt 22 and the second transfer roller 21 contact each other. The second transfer roller 21 is applied with a second transfer bias by an unillustrated transfer bias electric source, which forms a second transfer electric field between the second transfer roller 21 and the earthed tension roller 20.

Vertically below the transfer unit 75, a paper feed cassette 41 containing a bundle of papers including multiple recording papers P is located slide-detachably from a chassis of the printer. The paper feed cassette 41 contacts a paper feed roller 42 to the uppermost recording paper P in the bundle of papers, and rotates the roller anticlockwise at a predetermined time to fed the recording paper P to a paper feed path.

A pair of registration rollers 43 and 44 are located around the end of the paper feed path. As soon as the pair of registration rollers sandwich a recoding paper fed out from the paper feed cassette 41 between the rollers, the both rollers stop rotating. The rollers rotate again to feed the recording paper P to the second transfer nip such that the recording paper P meets the four-color toner image on the intermediate transfer belt 22 in the second transfer nip.

The four-color toner image on the intermediate transfer belt 22 are secondly transferred onto the recording paper at the second transfer nip at a time due to a second transfer electric field and a pressure of the nip to form a full-color toner image in combination with white of the recording paper P. After passing the second transfer nip, the recording paper P on which the full-color toner image is formed separates from the second transfer roller 21 and the intermediate transfer belt 22 at curvatures. Then, the recording paper P is fed to a fixer 40 through a feed path after transfer.

A residual toner untransferred onto a recording paper P adheres to the intermediate transfer belt 22 after passing the second transfer nip. The belt cleaner 71 contacting the surface of the intermediate transfer belt 22 removes the residual toner therefrom. The cleaning backup roller 72 located inside the loop of the intermediate transfer belt 22 assist the belt cleaner 71 to clean the belt from the inside of the loop.

The fixer 40 includes a fixing roller 45 including a heat source such as halogen lamps and a pressure roller 47 rotating while contacting the fixing roller 45 at a predetermined pressure, and the fixing roller 45 and the pressure roller 47 form a fixing nip. A recording paper fed into the fixer 30 is sandwiched by the fixing nip such that the surface bearing an unfixed toner image adheres to the fixing roller 45. Then, a toner in the toner image is softened with heat and pressure to fix the full-color image.

An input operation to an unillustrated operation portion formed of ten-key, etc. and a control signal transmitted from an unillustrated personal computer specify the one side print mode, a recording paper P discharged from the fixer 40 is discharged out of the apparatus as it is. Then, the recording paper P is stacked on a stack part 56 which is an upper surface of a cover on the top of the chassis.

The process units 26Y, 26C, 26M and 26K and the optical writing unit 27 form a toner image forming means.

Next, the photoreceptor in the process unit and a drive transmitter transmitting a drive force of a motor as a drive source to the developing roller are explained.

The printer includes a photoreceptor in the K process unit and a K drive transmitter transmitting a drive force to the developing roller, and photoreceptors in the Y, C and M process units and full-color drive transmitter transmitting a drive force to the developing roller.

Figure 3:
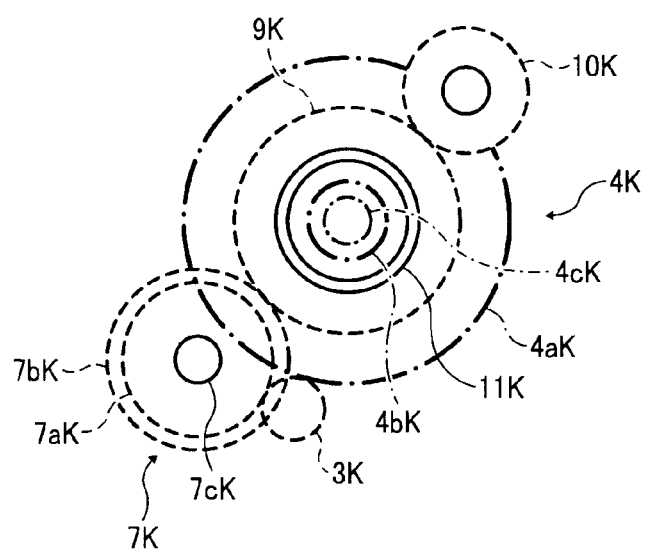
FIG. 3 is a front view of the black color drive transmitter.
Figure 4:
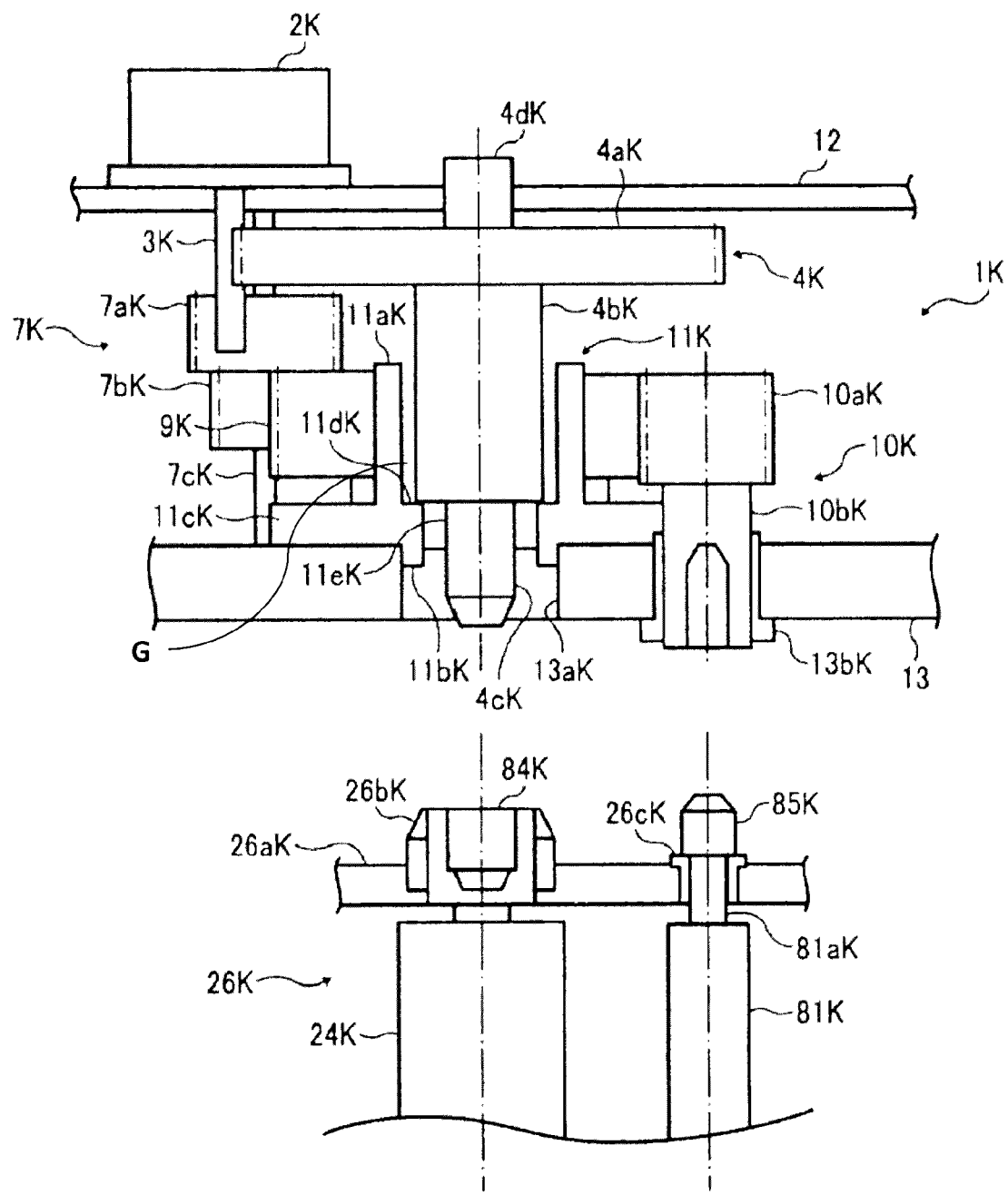
FIG. 4 is a cross-sectional view of the black color drive transmitter and its circumference.

FIG. 3 is a front view illustrating the photoreceptor 24K in the process unit 26K and a drive transmitter 1K transmitting a drive force to a developing roller 81K, and FIG. 4 is a cross-sectional view illustrating the drive transmitter 1K and its circumference.

As FIG. 4 shows, the drive transmitter 1K is located between a unit side plate 13 and a support plate 12. The drive transmitter 1K includes a first drive transmitting part transmitting a drive force to the photoreceptor 24K as a first rotator, and a second drive transmitting part transmitting a drive force to the developing roller as a second rotator. The first drive transmitting part includes a photoreceptor gear 4K transmitting a drive force of a drive motor 2K to the photoreceptor 24k, and the second drive transmitting part includes a developing drive gear array transmitting a drive force of a drive motor 2K to the developing roller 81K. The developing drive gear array is located so as to be included in a width in an axial direction to prevent the drive transmitter 1K from expanding in an axial direction.

The drive motor 2K is located at the back side of the support plate 12 and penetrates its rotational axis through an unillustrated hole formed on the support plate 12 from the back side such that a tip of the rotational axis 2aK is located between the support plate 12 and the unit side plate 13 while the motor unit is located out side of the support plate 12. The rotational axis of the drive motor 2K is directly subjected to gear cutting to form a drive gear 3K.

Above the rotational axis of the drive motor 2K, the photoreceptor gear 4K as a drive transmitting member is located. The photoreceptor gear 4K includes a disk-shaped gear 4aK, a first axis 4bK as a first rotational axis, a convex coupling 4cK as an engager and a second axis 4dK formed of the same material such as resins in a single piece. The photoreceptor gear 4K including the gear 4aK, the axis 4bK and the convex coupling 4cK in a single piece is free from eccentricity between the gear or the convex coupling and the rotational axis. Therefore, the photoreceptor drum 24K is free from speed variation due to the eccentricity.

The second axis 4dK is located at a rotational center of a surface facing the support plate 12 of the gear 4aK, and rotationally supported thereby. The first axis 4bK is located at a rotational center of a surface facing the unit side plate 13 of the gear 4aK, and the convex coupling 4cK is located at the top thereof.

The gear 4aK of the photoreceptor gear 4K has a radius larger than a length from an axial center of the photoreceptor 24K to an axial center of the developing roller 81K, and is engaged with the drive gear 3K. This can make one step speed reduction, a pitch error on the surface of the photoreceptor for one gear tooth small, and decrease uneven image density (banding) in a sub-scanning direction. Further, the one step speed reduction decreases parts and costs, and transmission error due to engaging error and eccentricity. The speed reduction ratio is determined based on a speed range from which high efficiency and high rotation preciseness can be obtained, from a relationship between an aimed speed of the photoreceptor 24K and motor properties. The convex coupling 4cK is a spline axis, on the outer circumference of which teeth are formed. The photoreceptor gear 4K is formed of a resin comparatively having a small friction coefficient such as polyacetal resins.

The developing drive gear array in the second drive transmitting part includes a clutch 7K, an idler gear 9K and a developing gear 10K.

The clutch 7K includes an input gear 7aK engaged with the drive gear 3K, an output gear 7bK engaged with the idler gear 9K and a clutch axis 7cK. The clutch axis 7cK is rotatably supported by the support plate 12 and the unit side plate 13. The clutch 7K, when an unillustrated controller turns on or off providing electricity thereto, transmits a rotary drive force of the input gear 7aK to the clutch axis 7cK or idles the input gear 7aK. Specifically, when an electricity is provided to the clutch 7K, the rotary drive force of the input gear 7aK is transmitted to the clutch axis 7cK to rotate the output gear 7bK. When an electricity is not provided thereto, the input gear 7aK idles on the clutch axis 7cK even when the drive motor 2 rotates, and the output gear 7bK stops rotating.

The idler gear 9K has a through-hole, and a cylinder 11aK of a holding member 11K is inserted into the through-hole to rotatably hold the idler gear 9K on the outer circumferential surface of the cylinder 11aK. The developing gear 10K includes a gear 10aK engaged with the idler gear 9K and a cylindrical concave coupling 10bK as a second rotational axis. The developing gear 10K is rotatably held by the unit side plate 13 because an outer circumferential surface of the cylindrical concave coupling 10bK is rotatably engaged with a bearing 13bK located on the unit side plate 13.

Since the idler gear 9K has a rotational center identical with that of the photoreceptor gear 4K, the through-hole of the idler gear 9K can be small and decrease of rigidity of the idler gear can be prevented.

The holding member 11K holding the idler gear 9K is formed of a resin comparatively having a small friction coefficient such as polyacetal resins, is located on the unit side plate 13. The cylinder 11aK of the holding member 11K has a motor side inner diameter larger than an outer diameter of the first axis 4bK of the photoreceptor gear 4K, which penetrates an inner circumferential surface of the cylinder 11aK of the holding member 11K with a gap therebetween. A fall down regulator 11eK having an inner diameter smaller than that of the cylinder 11aK at the photoreceptor side relative thereto. The fall down regulator 11eK faces the convex coupling 4cK of the photoreceptor gear 4K, and the convex coupling 4cK hits the fall down regulator 11eK to prevent the photoreceptor gear 4K from falling down. Therefore, the convex coupling 4cK is smoothly engaged with the concave coupling 10bK, and the process unit 26K can smoothly be installed in the apparatus. Further, the fall down regulator 11eK has an inner diameter smaller than an outer diameter of the first axis 4bK of the photoreceptor gear 4K. Therefore, an end surface of the first axis 4bK of the photoreceptor gear 4K hits a level difference 11dk formed between an inner circumferential surface of the cylinder 11aK and the fall down regulator 11eK, which prevents the photoreceptor gear 4K from moving in an axial direction. Namely, the level difference 11dk works as a movement regulator. This prevents the second axis 4dK of the photoreceptor gear from releasing from the support plate 12.

At the photoreceptor side of the holding member 11K, a contact surface 11cK contacting a surface of the unit side plate 12 at the motor side and a joint projection 11bk joining a positioning hole 13aK. The holding member 11K makes the joint projection 11bk join the positioning hole 13aK and contacts the contact surface 11cK to the motor side surface of the unit side plate 13 to rotatably fit the idler gear 9K to the apparatus with a gap G between the idler gear 9K and the first axis 4bK.

At the unit side plate 13 side of the photoreceptor 24K, a concave coupling 84K including inner teeth on its inner circumferential surface is located. A bearing 26bK formed on a case 26aK of the process unit 26K joins an outer circumferential surface of the concave coupling 84K, and a part of the bearing 26bK projects from the case 26aK. The convex coupling 4cK of the photoreceptor gear 4K and the concave coupling 84K at the photoreceptor 24K side have the following advantage, compared with a concave coupling of the photoreceptor gear and a convex coupling at the photoreceptor side. Namely, as for a concave coupling of the photoreceptor gear and a convex coupling at the photoreceptor side, the convex coupling projects from the case 26aK of the process unit and the couplings are engaged with each other apart from the case 26aK. As for the convex coupling of the photoreceptor gear 4K and the concave coupling at the photoreceptor 24K side, the couplings are engaged with each other at the case 26aK side. As a result, the couplings are engaged with each other at a position closer to the photoreceptor than a convex coupling at the photoreceptor side, which prevents the photoreceptor 24K from oscillating.

A rotational axis 81aK of the developing roller 81K is rotatably held by a bearing 26cK formed on the case 26aK, and a top thereof projects from the case 26aK. A spline axial member 85K as a convex coupling is formed on a top of the rotational axis 81aK of the developing roller 81K at the unit side plate side. The developing roller is not so influenced by speed variation as a photoreceptor, and the high-cost concave coupling the inner teeth of which is difficult to form is located in the apparatus to decrease the cost of the process unit 26K.

When the process unit 26K is installed in the apparatus, a part of the bearing 26bK supporting the photoreceptor 24K projecting from the case 26aK is joined to the positioning hole 13aK of the unit side plate 13. Thus, the process unit 26K is positioned in the apparatus. Then, the teeth of the convex coupling 4cK of the photoreceptor gear 4K are engaged with the inner teeth of the concave coupling 84K formed on the photoreceptor 24K. Further, the teeth of the spline axial member 85K formed on the axis 81aK of the developing roller 81K are engaged with the inner teeth of the concave coupling 10bK if the developing gear 10K. Since the fall down regulator 11eK of the holding member 11K prevents the photoreceptor gear 4K from falling down, the concave coupling 84K formed on the photoreceptor 24K can smoothly be inserted into the convex coupling 4cK of the photoreceptor gear 4K, and the process unit 26K can smoothly be installed in the apparatus.

A drive force of the drive motor 2K is transmitted to the photoreceptor 24K through the drive gear 3K, the photoreceptor gear 4K (the gear 4aK, the first axis 4bK and the convex coupling 4cK), and to the developing roller 81K through the drive gear 3K, the clutch 7K (the input gear 7aK and the output gear 7bK), the idler gear 9K and the developing gear 10K (the gear 10aK and the convex coupling 10bK). Then, the idler gear 9K scrapes an outer circumferential surface of the cylinder 11aK of the holding member 11K, but abrasions of the idler gear 9K and the cylinder 11aK can be prevented because the idler gear 9K and the holding member 11K are formed of a resin comparatively having a small friction coefficient. A ball bearing may be formed between the idler gear 9K scrapes the outer circumferential surface of the cylinder 11aK of the holding member 11K to rotatably hold the idler gear 9K on the holding member 11K.

The idler gear 9K held by the holding member 11K is preferably a gear being the same as a gear having the least revolutions per minute which is one of the multiple gears in the developing drive gear array. An inner circumferential surface of the idler gear 9K held by the holding member 11K scrapes the outer circumferential surface of the cylinder 11aK of the holding member 11K, and a scrape resistance inevitably occurs. When the idler gear 9K held by the holding member 11K has the least revolutions per minute, the scrape distance with the outer circumferential surface of the cylinder 11aK per one revolution of the developing roller can be shortest. This can prevent deterioration of transmission efficiency and heat generation. In addition, the idler gear 9K may be a gear being the same as a gear having the least torque which is one of the multiple gears in the developing drive gear array. This can prevent scrape resistance with outer circumferential surface of the cylinder 11aK of the holding member 11K, and deterioration of transmission efficiency and heat generation.

The first axis 4bK of the photoreceptor gear 4K penetrates the cylinder 11aK of the holding member 11K holding the idler gear 9K with a gap G. Therefore, a load variation of the developing roller 81K is not transmitted to the photoreceptor gear 4K through the idler gear 9K and the holding member 11K. As a result, due to backlash, etc. between the photoreceptor gear 4K and the drive gear 3K, a drive force from the drive gear 3K is not transmitted to the photoreceptor gear 4K for a moment, which prevents speed variation of the photoreceptor 24K.

The holding member 11K preferably has a linear expansion coefficient smaller than that of the photoreceptor gear. The holding member 11K is easy to heat up because the idler gear scrapes the holding member 11K. Therefore, the holding member 11K having a linear expansion coefficient smaller than that of the photoreceptor gear prevents itself from thermally expanding to contact the photoreceptor gear.

The idler gear 9K is located closer to the process unit 26K than the gear 4aK of the photoreceptor gear 4K. The gear 4aK of the photoreceptor gear 4K has a radius longer than a distance between an axial center of the photoreceptor 24K and an axial center of the developing roller 81K. When the idler gear 9K is located closer to the motor than the gear 4aK of the photoreceptor gear 4K, the idler gear 9K and the developing gear 10aK cannot be engaged with each other. In this case, a rotational axis is needed to locate outside the gear 4aK of the photoreceptor gear, and a first relay gear engaging with the idler gear 9K and a second relay gear engaging with the gear 10aK of the developing gear need be formed on the rotational gear. This possibly increases the number of parts and enlarges the apparatus. The idler gear 9K located closer to the process unit 26K than the gear 4aK of the photoreceptor gear 4K can directly be engaged with the gear 10aK of the developing gear 10K, and can reduce the number of parts and downsize the apparatus compared with the idler gear 9K located closer to the motor than the gear 4aK of the photoreceptor gear 4K. Further, the gear 4aK of the photoreceptor gear can be engaged with a bedrock of the drive gear 3K. Therefore, a deflection of the drive gear 3K is difficult to occur, and a rotational drive force of the motor can precisely be transmitted from the drive gear to the gear 4aK of the photoreceptor gear.

Next, a full-color drive transmitter is explained.

Figure 5:
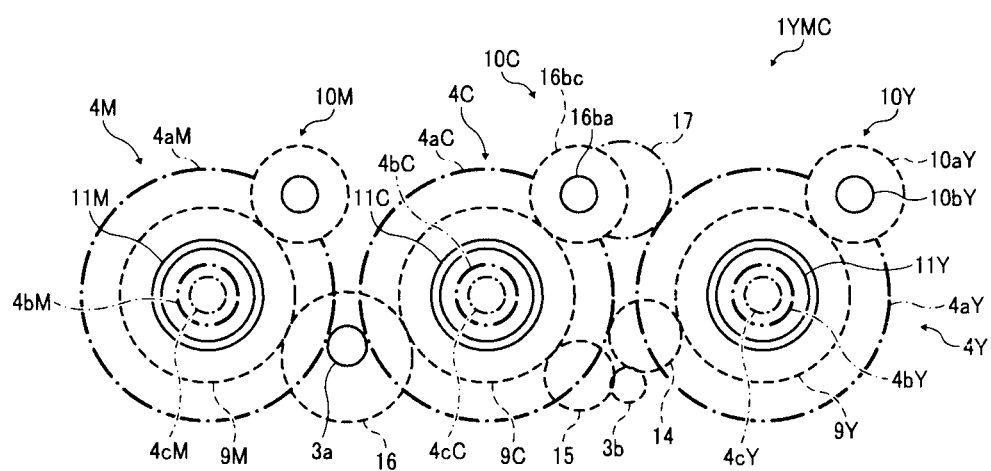
FIG. 5 is a front view of the full-color drive transmitter.
Figure 6:
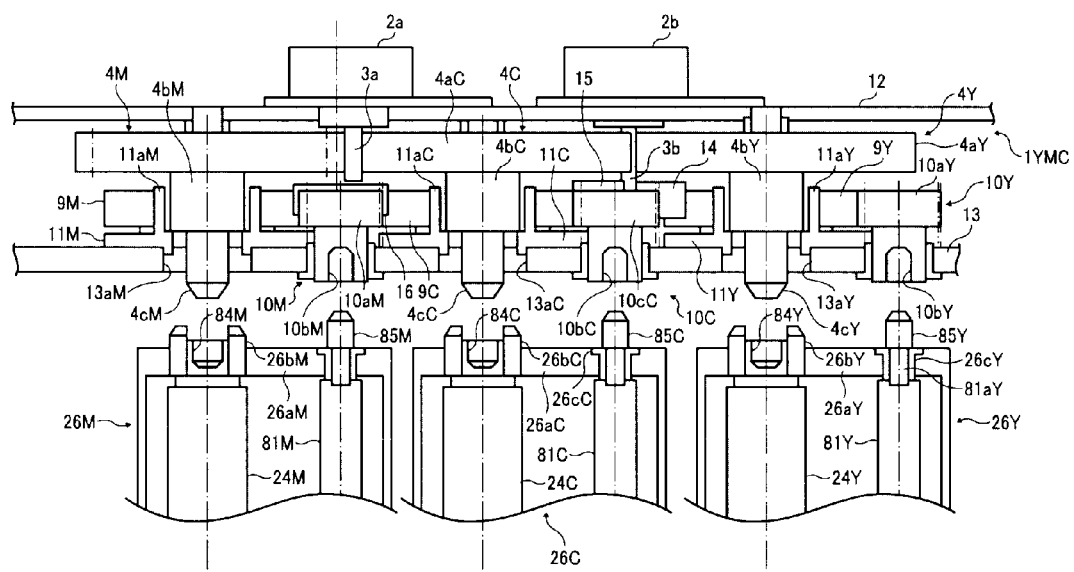
FIG. 6 is a cross-sectional view of the full-color drive transmitter and its circumference.

FIG. 5 is a front view of the full-color drive transmitter 1YCM and FIG. 6 is a cross-sectional view of the full-color drive transmitter 1YCM and its circumference. Only features of the full-color drive transmitter 1YCM are explained, and explanations of the same configurations as those of the K drive transmitter are omitted.

The full-color drive transmitter 1YCM is located between the unit side plate 13 and the support plate 12. The full-color drive transmitter 1YCM includes a first drive transmitting part including a full-color photoreceptor gear array and transmitting a drive force of a full-color photoreceptor drive motor 2a as a drive source to each of photoreceptors 24Y, 24C and 24M, and a second drive transmitting part including a full-color developing drive gear array and transmitting a drive force of a developing drive motor 2b as a drive source to each of developing rollers 81Y, 81C and 81M.

The full-color photoreceptor gear array of the first drive transmitting part includes photoreceptor gears 4Y, 4C and 4M and a photoreceptor idler gear 17. Each of the photoreceptor gears 4Y, 4C and 4M has the same configuration as that of the photoreceptor gear 4K. A gear 4aM of the photoreceptor gear 4M and a gear 4aC of the photoreceptor gear 4C are engaged with a drive gear 3a formed on a rotational axis of the full-color photoreceptor drive motor 2a. The photoreceptor idler gear 17 is located between the photoreceptor gear 4Y and the photoreceptor gear 4C, and engaged with a gear 4aY of the photoreceptor gear 4Y and a gear 4aC of the photoreceptor gear 4C.

A drive force of the full-color photoreceptor drive motor 2a is transmitted to the photoreceptor 24M through the drive gear 3a and the photoreceptor gear 4M; to the photoreceptor 24C from the drive gear 3a through the photoreceptor gear 4C; and to the photoreceptor 24Y from the drive gear 3a through the photoreceptor gear 4C, the idler gear 17 and the photoreceptor gear 4Y in this order.

Next, the full-color developing drive gear array is explained.

A first relay gear 14 and a second relay gear 15 are engaged with a developing drive gear 3b formed on a rotational axis of the developing drive motor 2b. An idler gear 9Y is engaged with the first relay gear 14. The idler gear 9Y is rotatably held on an outer circumferential surface of a cylinder 11aY of a holding member 11Y as the idler gear 9K is, and engaged with a developing gear 10Y.

An idler gear 9C is engaged with the second relay gear 15 and rotatably held on an outer circumferential surface of a cylinder 11aC of a holding member 11C. A developing gear 10C and a third relay gear 16 are engaged with the idler gear 9C. An idler gear 9M is engaged with the third relay gear 16 and rotatably held on an outer circumferential surface of a cylinder 11aM of a holding member 11M. The idler gear 9M is engaged with a developing gear 10M. Each of the developing gears 10Y, 10C and 10M has the same configuration as that of the developing gear 10K.

A drive force of the full-color photoreceptor drive motor 2b is transmitted to the developing roller 81Y through the developing drive gear 3b, the first relay gear 14, the idler gear 9Y and the developing gear 10Y; to the developing roller 81C through the developing drive gear 3b, the idler gear 9C and the developing gear 10C; and to the developing roller 81M through the developing drive gear 3b, the second relay gear 15, the idler gear 9C, the third relay gear 16, the idler gear 9M and the developing gear 10M.

Each of first axes 4bY, 4bC and 4bM of the photoreceptor gears 4Y, 4C and 4M penetrates each of the cylinders 11aY, 11aC and 11aM of the holding members 11Y, 11C and 11M with a gap. Therefore, a load variation of each of the developing rollers 81Y, 81C and 81M is not transmitted to each of the photoreceptor gears 4Y, 4C and 4M to prevent speed variations of the photoreceptors 24Y, 24C and 24M.

The idler gears 9Y, 9C and 9M located closer to the unit than the gears 4aY, 4aC and 4aM of the photoreceptor gears can be engaged with gears 10aY, 10aC and 10aM of the developing gears even when each of the gears 4aY, 4aC and 4aM has a radius longer than a distance from an axial center of the photoreceptor to an axial center of the developing roller. This can reduce the number of parts and downsize the apparatus. Further, the gear 4aM of the photoreceptor gear 4M and the gear 4aC of the photoreceptor gear 4C can be engaged with a bedrock of the drive gear 3a. Therefore, a rotational drive force of the motor can precisely be transmitted from the drive gear 3a to the gears 4aM and 4aC.

The full-color drive transmitter 1YCM has a drive source giving a drive force to the developing rollers 81Y, 81C and 81M and another drive source giving a drive force to the photoreceptors 24Y, 24C and 24M. Therefore, a route for transmitting the drive force to the photoreceptors 24Y, 24C and 24M and a route for transmitting the drive force to the developing rollers 81Y, 81C and 81M can completely be separated from each other. Therefore, a load of each of the developing rollers 81Y, 81C and 81M does not influence on rotation of each of the photoreceptors 24Y, 24C and 24M, which prevents variation of rotation speed thereof.

The full-color developing drive gear array within a width of an axial direction of each of the photoreceptor gears 4Y, 4C and 4M prevents the full-color drive transmitter 1YCM from expanding in an axial direction.

The number of rotations and load torque of each of the idler gears 9Y, 9C and 9M held by the holding members 11Y, 11C and 11M are preferably smaller than those of the other gears in the full-color developing drive gear array, which prevents deterioration of transmission efficiency and heat generation.

Each of the holding members 11Y, 11C and 11M having a linear expansion coefficient smaller than that of each of the photoreceptor gears 4Y, 4M and 4C prevents itself from thermally expanding to contact each of the photoreceptor gears 4Y, 4M and 4C.

The drive transmitter transmits a drive force of a drive motor to the photoreceptor 24 and the developing roller 81 of the process unit, and may transmit a drive force of a drive motor to the charging roller 25 and the feed roller 80 instead of the developing roller 81. Further, the drive transmitter may transmit a drive force transmitted to the developing roller 81 to the charging roller 25 and the feed roller 80. In addition, the drive transmitter may have three or more drive transmitting parts. The first axis of the photoreceptor gear may penetrate through multiple gears with gaps, respectively. Further, a single drive source may transmit a drive force to each of the first and second rotators.

The first axis 4b rotating with a photoreceptor gear 4a which is a gear of the first drive transmitting part and penetrating through the idler gear with a gap can prevent speed variation of the photoreceptor. In addition, a projected area of the gear 4a in an axial direction can effectively used, and the apparatus can be downsized.

The first drive transmitting part includes a gear engaging with a drive gear of a drive source, a first rotational axis extending from a rotational center of the gear, and a photoreceptor gear 4 formed on the top of the first rotational axis including an engaging means engaging with a first rotator. Therefore, there is no installation eccentricity of a gear and a convex coupling to the first rotational axis, which eliminates speed variation of the photoreceptor 24K.

The developing drive gear array with an axial direction of the photoreceptor gear 4 can prevent the drive transmitter from enlarging in an axial direction.

The developing gear array which is a drive transmitting part gear besides the first drive transmitting part located closer to the rotator than the first drive transmitting part gear, when the photoreceptor gear 4 has a larger diameter, can reduce the number of gears and parts more than the developing gear array located closer to the motor than the first drive transmitting part gear. Further, enlargement of the apparatus can be prevented, and the photoreceptor gear 4 can be engaged with a bedrock of the drive gear 3K to precisely drive the photoreceptor.

A holding member 11 rotatably holds an idler gear 9 the first axis of the photoreceptor gear 4 penetrates with a gap. Specifically, the holding member 11 rotatably holds the idler gear on its outer circumferential surface and its inner circumferential surface has a cylinder 11a the axis of the photoreceptor penetrates with a predetermined gap. When the holding member is fixed on the apparatus, the idler gear is rotatably fixed thereon with a gap from the first axis penetrating through the gear. A level difference 11d as a regulation member regulates movement of the photoreceptor gear 4 in an axial direction. This prevents the photoreceptor gear 4 from releasing from the support plate 12.

A fall down regulator 11e regulating fall down of the photoreceptor gear 4 can smoothly engage a convex coupling 4c thereof with a concave coupling 84 of the photoreceptor, and can smoothly place a process unit 26 in the apparatus.

The holding member 11 having a linear expansion coefficient smaller than that of the photoreceptor gear 4 can prevent itself from contacting the photoreceptor gear even when thermally expanded with heat due to scrape with the idler gear 9. This prevents the photoreceptor gear 4 from scraping the holding member 11 and varying in its rotational speed.

The idler gear the first axis 4b of the photoreceptor gear 4 penetrates having the lowest rotation number among multiple gears in the drive transmitting part has the shortest scrape distance with the holding member 11 holding the idler gear.

This prevents deterioration of transmission efficiency and heat generation due to scrape with the holding member 11.

A rotational center of the idler gear and a rotational center of the photoreceptor gear located at the same position can make a penetration hole of the idler gear small, which prevents the idler gear from enlarging and weakening.

The engaging coupling of the photoreceptor gear is a convex coupling engaging with a concave coupling formed on the photoreceptor, which makes an engaging position of the couplings closer to the photoreceptor and prevents the photoreceptor from oscillating better than a convex coupling of the photoreceptor and a concave coupling of the photoreceptor gear.

Since a drive source transmitting a drive force to the developing drive gear array is different from a drive source transmitting a drive force to the photoreceptor gear, a rotational load of the developing roller does not influence upon the photoreceptor. This can prevent the photoreceptor from varying its rotational speed.

The drive transmitter in an image forming apparatus including multiple rotators can prevent the apparatus from enlarging. Further, when a rotator to which the first drive transmitting part transmits a drive force is a photoreceptor bearing an image, speed variation of the photoreceptor and uneven image density can be prevented well.

The drive transmitter located in the apparatus can make the process unit less expensive than the drive transmitter located in the process unit.

What is claimed is:

1. A drive transmitter, comprising:
   a first rotational axis configured to transmit a drive force of a drive source to a first rotator;
   a second rotational axis configured to transmit a drive force of the drive source to a second rotator;
   an idler gear configured to transmit a drive force to the second rotational axis;
   a drive transmitting member integrating the first rotational axis;
   a gear engaging with a drive gear of the drive source; and
   engaging means formed at an end of the first rotational axis, engaging with the first rotator,
   wherein the first rotational axis penetrates the idler gear with a gap therebetween, and
   wherein a holding member contacts the end of the rotational axis and comprises a regulator regulating movement of the drive transmitting member in an axial direction.

2. An image forming apparatus, comprising:
   multiple rotators, and
   a drive transmitter configured to transmit a drive force from a drive source to each of the rotators,
   wherein the drive transmitter is the drive transmitter according to claim 1.

3. The image forming apparatus of claim 2, wherein the multiple rotators comprise image bearing members.

4. The image forming apparatus of claim 2, further comprising a unit including the multiple rotators and the drive transmitter, detachable from the image forming apparatus.

5. The image forming apparatus of claim 4, further comprising an installed unit that includes the multiple rotators.

6. A drive transmitter, comprising:
   a first rotational axis configured to transmit a drive force of a drive source to a first rotator;
   a second rotational axis configured to transmit a drive force of the drive source to a second rotator;
   an idler gear configured to transmit a drive force to the second rotational axis;
   a drive transmitting member integrating the first rotational axis;
   a gear engaging with a drive gear of the drive source; and
   engaging means formed at an end of the first rotational axis, engaging with the first rotator,
   wherein the first rotational axis penetrates the idler gear with a gap therebetween, and
   wherein a holding member further comprises a regulator regulating a fall down amount of the drive transmitting member.

7. A drive transmitter, comprising:
a first rotational axis configured to transmit a drive force of a drive source to a first rotator;
a second rotational axis configured to transmit a drive force of the drive source to a second rotator;
an idler gear configured to transmit a drive force to the second rotational axis;
a drive transmitting member integrating the first rotational axis;
a gear engaging with a drive gear of the drive source; and
engaging means formed at an end of the first rotational axis, engaging with the first rotator,
wherein the first rotational axis penetrates the idler gear with a gap therebetween, and
wherein a holding member is formed of a material having a linear expansion coefficient smaller than that of the drive transmitting member.

8. A drive transmitter, comprising:
a first rotational axis configured to transmit a drive force of a drive source to a first rotator;
a second rotational axis configured to transmit a drive force of the drive source to a second rotator; and
an idler gear configured to transmit a drive force to the second rotational axis,
wherein the first rotational axis penetrates the idler gear with a gap therebetween, and
wherein the idler gear has fewer rotations than those of a gear transmitting the drive force to the idler gear and a gear transmitting the drive force to the second rotational axis from the idler gear.

9. A drive transmitter, comprising:
a first rotational axis configured to transmit a drive force of a drive source to a first rotator;
a second rotational axis configured to transmit a drive force of the drive source to a second rotator; and
an idler gear configured to transmit a drive force to the second rotational axis,
wherein the first rotational axis penetrates the idler gear with a gap therebetween, and
wherein the idler gear has less torque than those of a gear transmitting the drive force to the idler gear and a gear transmitting the drive force to the second rotational axis from the idler gear.

* * * * *